No. 697,210. Patented Apr. 8, 1902.
N. C. KRAUSS.
CORNSTALK CUTTER.
(Application filed July 11, 1901.)
(No Model.) 3 Sheets—Sheet 1.
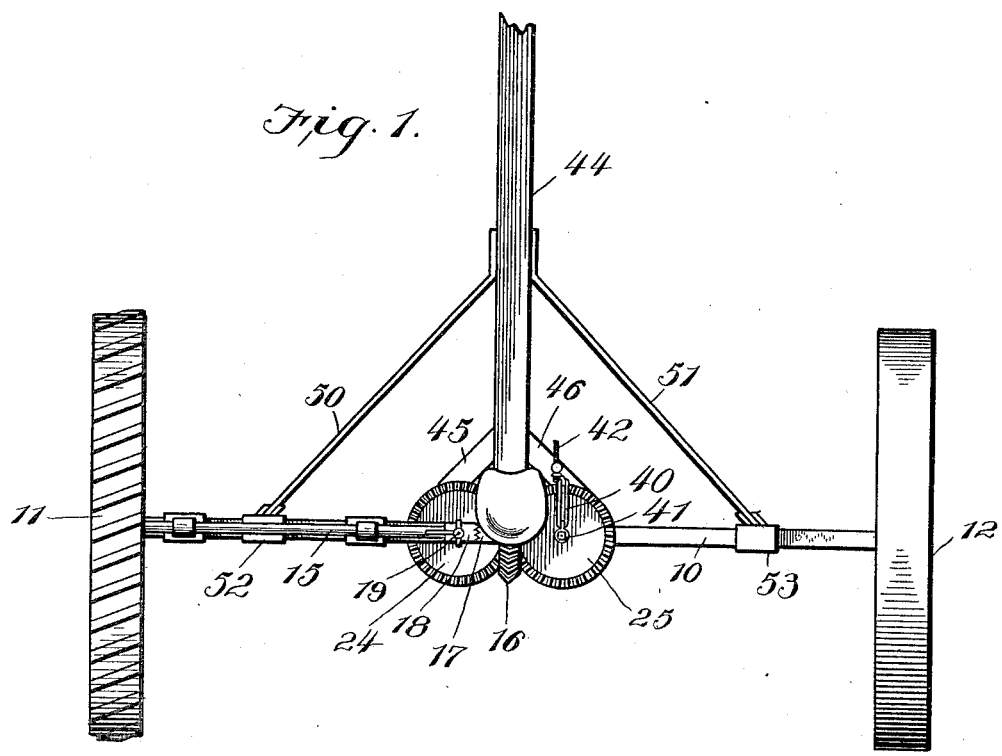
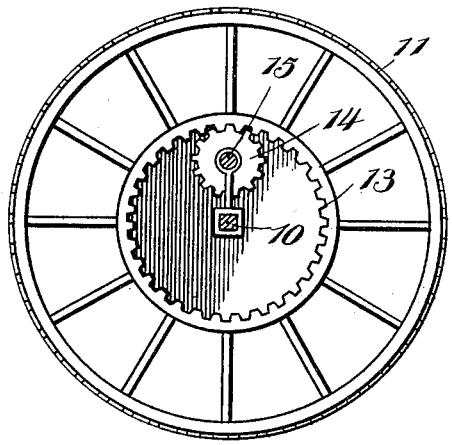
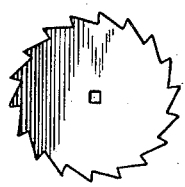
Witnesses
Inventor
N. C. Krauss,
Attorneys No. 697,210. Patented Apr. 8, 1902.
N. C. KRAUSS.
CORNSTALK CUTTER.
(Application filed July 11, 1901.)
(No Model.) 3 Sheets—Sheet 3.

Witnesses
Inventor
N. C. Krauss,
By Chandler & Chandler
Attorneys

UNITED STATES PATENT OFFICE.

NORMAN C. KRAUSS, OF WALTON, INDIANA.

CORNSTALK-CUTTER.

SPECIFICATION forming part of Letters Patent No. 697,210, dated April 8, 1902.

Application filed July 11, 1901. Serial No. 67,875. (No model.)

*To all whom it may concern:*

Be it known that I, NORMAN C. KRAUSS, a citizen of the United States, residing at Walton, in the county of Cass, State of Indiana, have invented certain new and useful Improvements in Cornstalk-Cutters; and I do hereby declare the following to be a full, clear, and exact description of the invention, such as will enable others skilled in the art to which it appertains to make and use the same.

This invention relates to machines for cutting off cornstalks in the field; and it has for its object to provide a simple, cheap, and efficient construction which may be drawn through the field and includes knives or other form of cutters which will engage and cut off the stalks and wherein the cutting devices may be raised or lowered to cut off the stalks at different heights under different conditions.

A further object of the invention is to provide a construction wherein the cutting devices will be held against rearward displacement during the operation of the apparatus and wherein the cutters may rise and fall to conform to unevenness of the ground.

Other objects and advantages of the invention will be understood from the following description.

Figure 2:
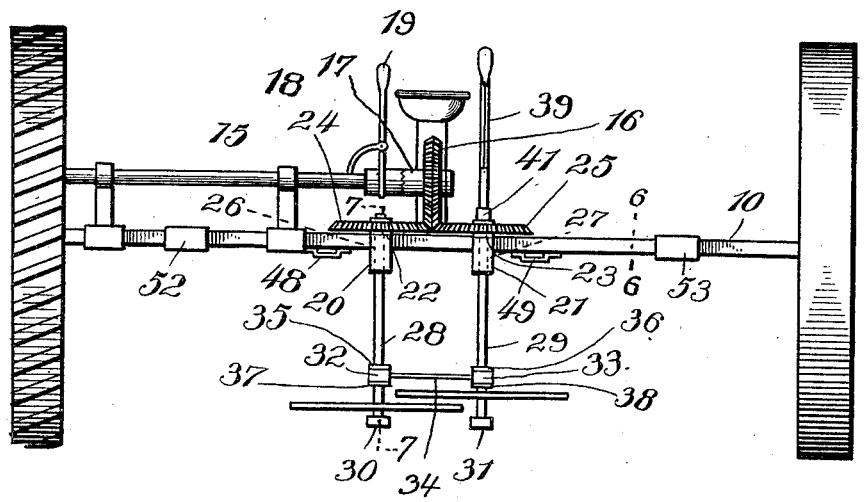
Figure 3:
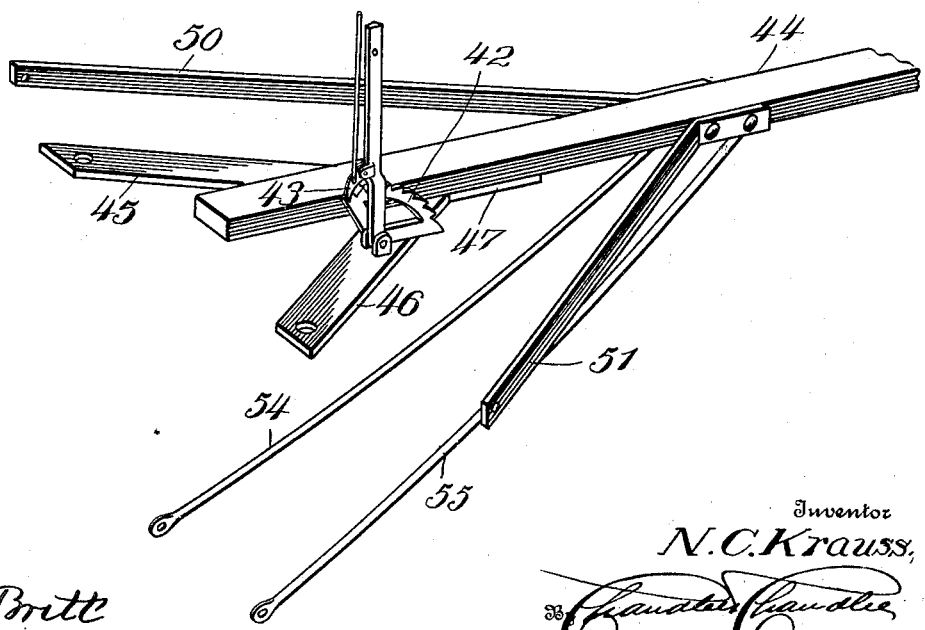
Figure 6:
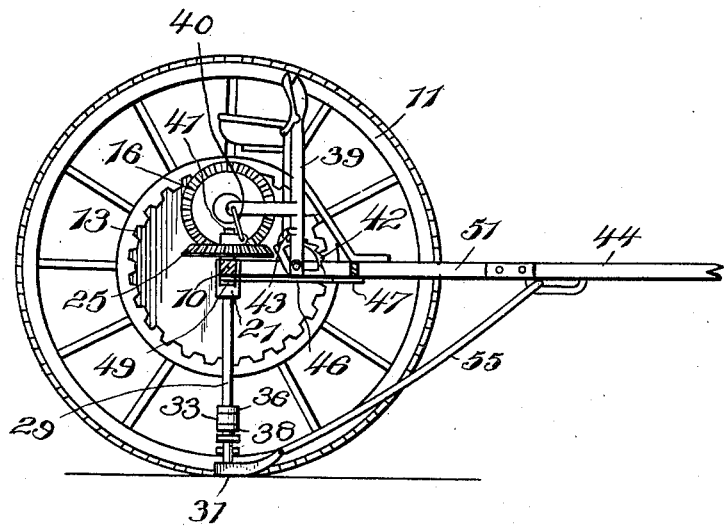
Figure 7:
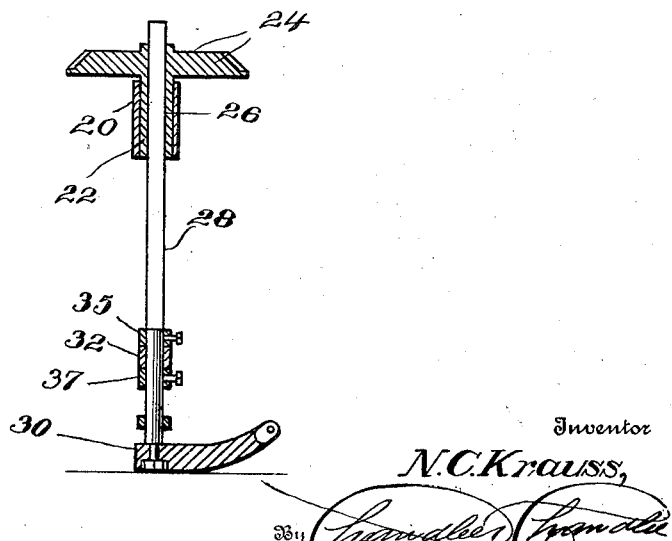

In the drawings forming a portion of this specification and in which like numerals of reference indicate similar parts in the several views, Figure 1 is a top plan view showing the machine. Fig. 2 is a rear elevation of the machine. Fig. 3 is a detail view showing the tongue and the means for connecting it with the axle and the shoes at the lower ends of the cutter-shafts. Fig. 4 is a section taken transversely through the axle and showing the bull-wheel and its internal gear. Fig. 5 is a view showing a second form of cutter that may be used. Fig. 6 is a section on line 6 6 of Fig. 2. Fig. 7 is a section on line 7 7 of Fig. 2.

Referring now to the drawings, the present cornstalk-cutting machine comprises an axle 10, which is fixed, and on the spindles at the ends of which are rotatably mounted the wheels 11 and 12, of which the wheel 11 is a bull-wheel and is provided with a concentric internal gear 13, with which is engaged the pinion 14 at one end of shaft 15, which latter is journaled in bearings upon the axle and is provided at its inner end with a double beveled gear 16. This beveled gear is loose upon the shaft and has a clutch member 17 on its hub for engagement by a second clutch member 18, which is splined upon the shaft for movement into and out of engagement with the member on the gear. This slidable clutch member is moved into and out of operative position by means of a hand-lever 19, so that the beveled gear may be readily connected to and disconnected from the shaft. The use of this beveled gear will be presently explained.

Fixed to the axle 10 are the two bearing-boxes 20 and 21, in which are journaled the two sleeves 22 and 23, on the upper ends of which are fixed the bevel-gears 24 and 25, which mesh with the double beveled gear on the drive-shaft. Through the two sleeves are formed the cross-sectionally rectangular passages 26 and 27, and slidably engaged therewith are the two cross-sectionally rectangular cutter-shafts 28 and 29, which may be raised and lowered through the sleeves, while when the gears and sleeves are rotated the shafts are rotated.

At the lower ends of the shafts 28 and 29 are shoes 30 and 31, in which the shafts are journaled, said shoes having their forward ends turned slightly upwardly, so that they may slide easily over the uneven surface of the ground, and attached to the shafts directly above the shoes are cutters, which may be in the form of spiders (shown in Fig. 2) or may be in the form of toothed disks. (Shown in Fig. 5.) The lower portions of the cutter-shafts are round, and these portions have mounted upon them the collars 32 and 33, in which the shafts rotate and which collars are connected by a transverse cutting-blade 34, which is held from upward movement with respect to the shafts by fixed collars 35 and 36, while downward displacement is prevented by other collars 37 and 38, fixed on the shafts. The cutters in their movements move the stalks against the fixed knife, in connection with which they are cut. When the cutters are to be raised from their operative positions, one of the cutter-shafts is raised and the other moves upwardly with it. This raising of one of the cutter-shafts is accomplished by means of the hand-lever 39, having a link 40 connecting it with the collar 41, which is mounted upon a rounded portion of the cutter-shaft and is split to permit of application and removal of it. A notched segment 42 is provided for engagement by a pawl 43 upon the lever to hold the latter in different adjusted positions and hold the cutters at different elevations.

A tongue 44 is provided for the machine and is connected to the axle 10 by means of the arms 45 and 46 of a bifurcated plate 47, attached to the tongue, the ends of the arms being engaged under clips 48 and 49, engaged with the axle. Stays 50 and 51 are likewise connected to the tongue and are taken rearwardly and divergingly and are connected to clips 52 and 53 on the axle. To prevent rearward displacement on the lower ends of the cutter-shafts, bars 54 and 55 are pivotally connected to the forward ends of the shoes and are taken forwardly and upwardly and convergingly and are connected to the tongue, so that the shoes are drawn directly from the tongue and at the same time may rise and fall to correspond to the uneven ground over which they may pass.

What is claimed is—

1. A stalk-cutting machine comprising vertical shafts mounted for sliding movement, a fixed knife connecting the shafts, cutters mounted upon and rotatable with the shafts in operable relation to the fixed knife, means for rotating the shafts and means for raising and lowering the shafts slidably and therewith the cutters.

2. A stalk-cutting machine comprising an axle having supporting-wheels, vertical cutter-shafts provided with cutting mechanisms, shoes at the lower ends of the shafts, and a tongue connected with the axle and with the shoes.

3. A stalk-cutting machine comprising an axle having supporting-wheels, cutter-shafts connected with the axle and adapted for longitudinal sliding movement, means connected with a supporting-wheel for rotating the cutter-shafts, shoes at the lower ends of the cutter-shafts, a tongue connected with the axle, movable connections between the tongue and shoes, and means for raising and lowering the cutter-shafts with the cutters.

4. A stalk-cutting machine comprising an axle provided with supporting-wheels, a drive-shaft mounted upon the axle and operatively connected with a supporting-wheel for rotation thereby, a double beveled gear mounted upon the drive-shaft, means for clutching the double gear to the shaft, vertical sleeves rotatably mounted upon the axle and provided with bevel-gears engaged with the double gear, said sleeves having angular passages therethrough, cutter-shafts slidably fitted in the passages of the sleeves, a fixed cutter mounted upon the shafts, movable cutters mounted upon the shafts for coöperation with the fixed cutter, and means connected with one of the cutter-shafts for raising them both with the cutters thereon.

5. A stalk-cutting machine comprising cutter-shafts, a fixed knife mounted upon the cutter-shafts, and cutters carried by the shafts and rotatable therewith in operative relation to the fixed knife.

6. A stalk-cutting machine comprising cutter-shafts, a fixed knife having terminal bearings in which the shafts are mounted, and cutters carried by and rotatable with the shafts in operative relation to the fixed knife.

7. A stalk-cutting machine comprising shafts mounted for longitudinal sliding movement, a fixed knife having bearings in which the shafts are received, cutters mounted upon and rotatable with the shafts in operative relation to the fixed knife, means for rotating the shafts, and means for sliding the shafts longitudinally to raise and lower the cutters.

In testimony whereof I affix my signature in presence of two witnesses.

NORMAN C. KRAUSS.

Witnesses:
OWEN A. DUTCHESS,
IRA M. PHILLIPS.